(12) United States Patent
Yamasuge

(10) Patent No.: US 8,185,755 B2
(45) Date of Patent: May 22, 2012

(54) WIRELESS COMMUNICATION APPARATUS, WIRELESS COMMUNICATION SYSTEM, WIRELESS COMMUNICATION METHOD, AND PROGRAM

(75) Inventor: Hiroyuki Yamasuge, Tokyo (JP)

(73) Assignee: Sony Corporation, Tokyo (JP)

( * ) Notice: Subject to any disclaimer, the term of this patent is extended or adjusted under 35 U.S.C. 154(b) by 535 days.

(21) Appl. No.: 12/416,274

(22) Filed: Apr. 1, 2009

(65) Prior Publication Data

US 2009/0254766 A1 Oct. 8, 2009

(30) Foreign Application Priority Data

Apr. 8, 2008 (JP) ................ P2008-100743

(51) Int. Cl.
*G06F 1/00* (2006.01)
(52) U.S. Cl. ........................ 713/300; 323/355
(58) Field of Classification Search ............. 713/300; 323/355
See application file for complete search history.

(56) References Cited

U.S. PATENT DOCUMENTS

| | | | | |
|---|---|---|---|---|
| 6,967,462 B1* | 11/2005 | Landis | ............. | 320/101 |
| 7,786,419 B2* | 8/2010 | Hyde et al. | ............. | 250/201.1 |
| 8,024,012 B2* | 9/2011 | Clevenger et al. | ............. | 455/572 |
| 2006/0284593 A1* | 12/2006 | Nagy et al. | ............. | 320/109 |
| 2007/0021140 A1* | 1/2007 | Keyes et al. | ............. | 455/522 |
| 2010/0083012 A1* | 4/2010 | Corbridge et al. | ............. | 713/300 |
| 2011/0043327 A1* | 2/2011 | Baarman et al. | ............. | 340/5.8 |
| 2011/0133691 A1* | 6/2011 | Hautanen | ............. | 320/108 |

FOREIGN PATENT DOCUMENTS

| | | |
|---|---|---|
| JP | 2003-047177 | 2/2003 |
| JP | 2004-112646 | 4/2004 |
| JP | 2006-238548 | 9/2006 |
| JP | 2007-267110 | 10/2007 |

* cited by examiner

*Primary Examiner* — Mark Connolly
(74) *Attorney, Agent, or Firm* — Finnegan, Henderson, Farabow, Garrett & Dunner, L.L.P.

(57) ABSTRACT

A wireless communication apparatus according to the present invention includes a user terminal information acquiring unit that acquires user terminal information related to user terminals, which are connected through a wireless communication network to enable communication, from the user terminals; a wireless power transmitting circuit that wirelessly supplies power to the user terminals; a control unit that determines whether or not to supply the power to the user terminals based on the user terminal information; a user terminal location acquiring unit that acquires location information of the user terminals where the power is supplied; and a transmission power direction instructing unit that controls directivity of power supply based on the location information of the user terminals.

8 Claims, 12 Drawing Sheets

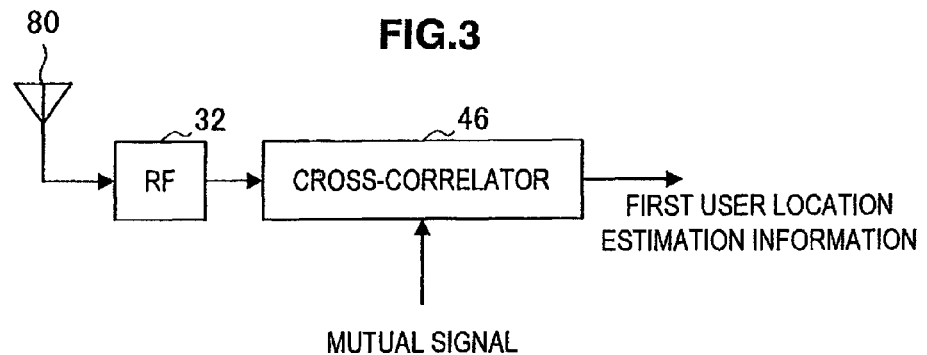
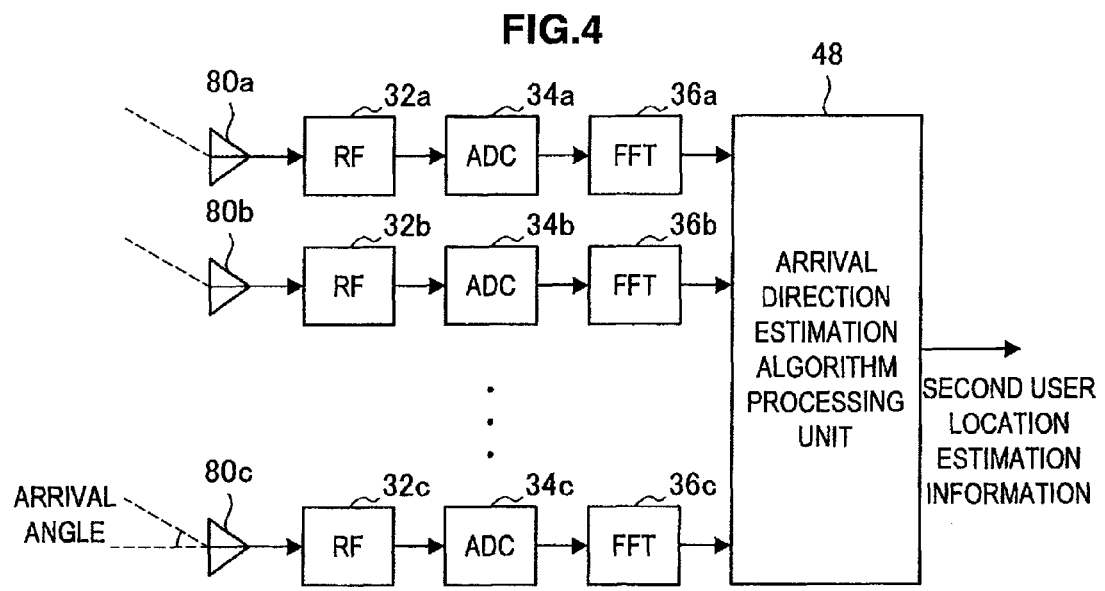

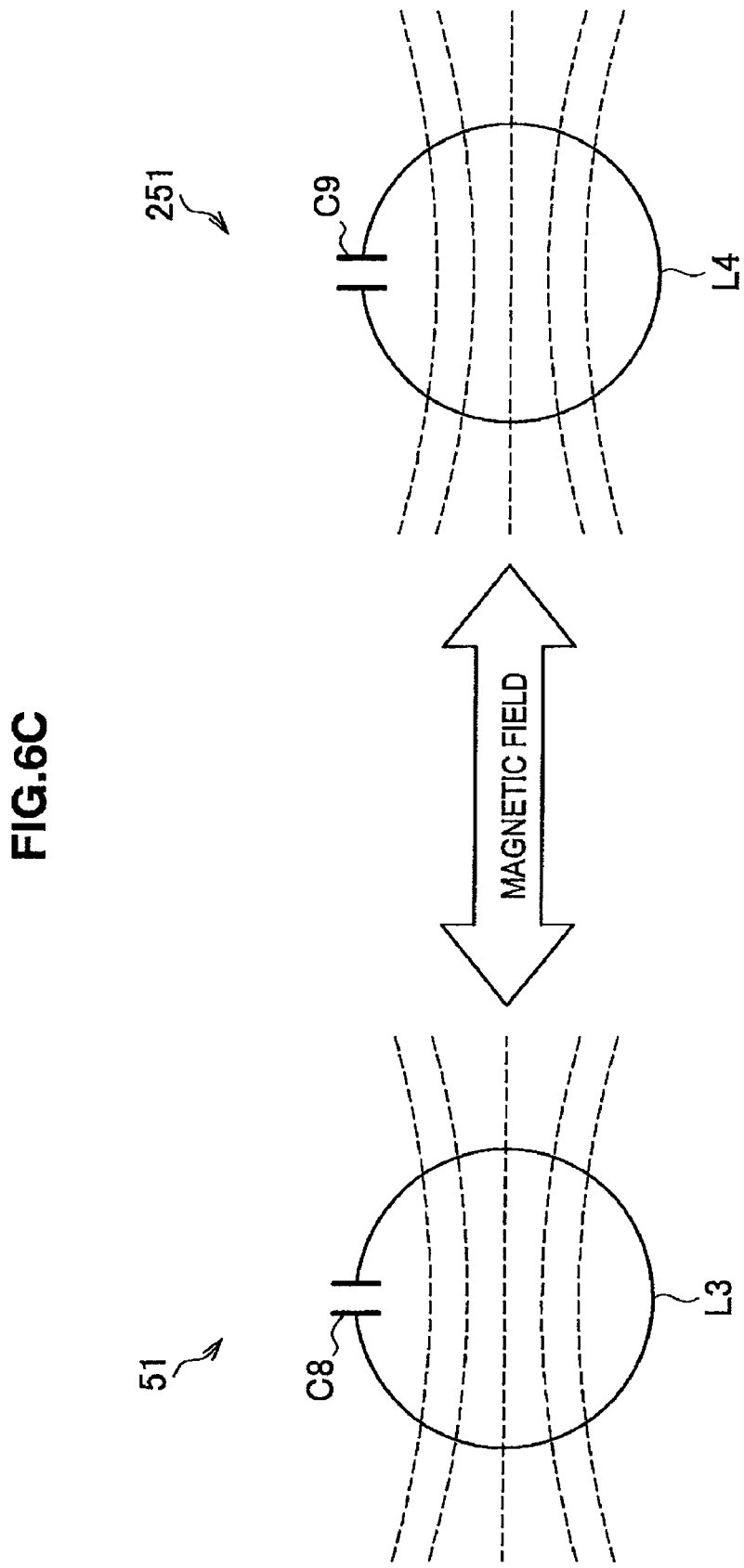

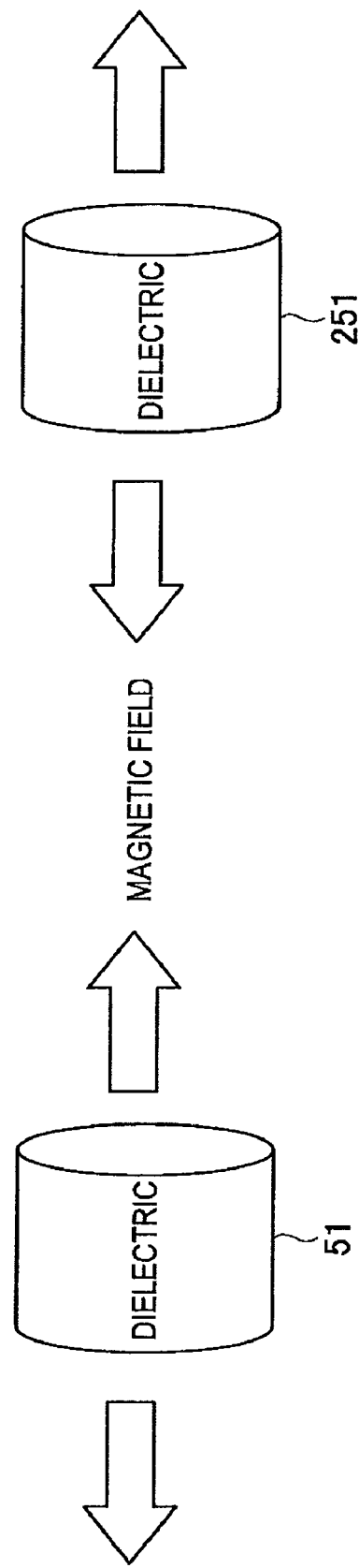

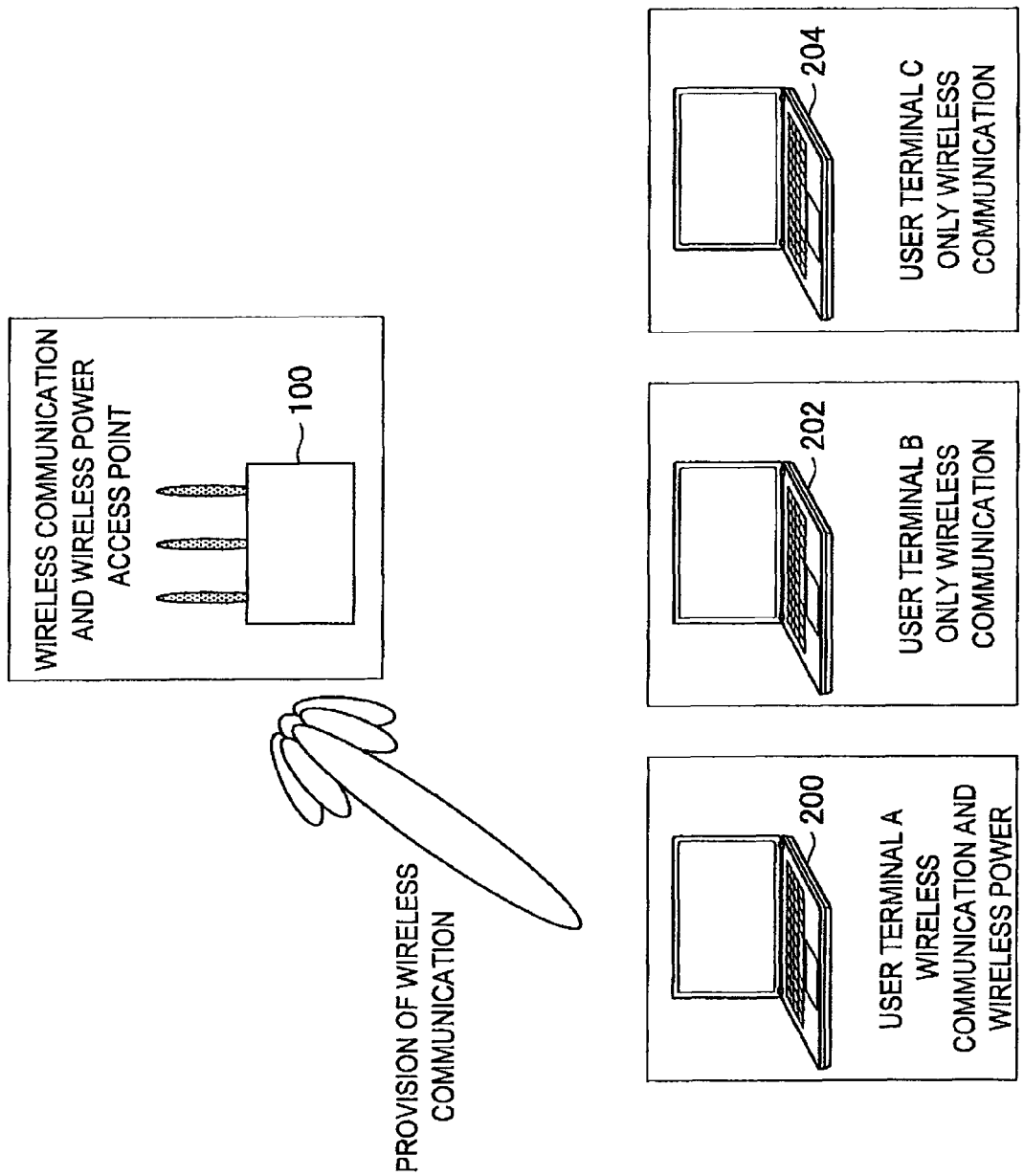

WIRELESS COMMUNICATION APPARATUS, WIRELESS COMMUNICATION SYSTEM, WIRELESS COMMUNICATION METHOD, AND PROGRAM

BACKGROUND OF THE INVENTION

1. Field of the Invention

The present invention relates to a wireless communication apparatus, a wireless communication system, a wireless communication method, and a program.

2. Description of the Related Art

In recent years, wireless power transmitting apparatuses that can wirelessly transmit power have been suggested, and an example of the wireless power transmitting apparatuses is disclosed in Japanese Patent Application Laid-Open (JP-A) No. 2006-238548. Specifically, the wireless power transmitting apparatus that is disclosed in JP-A No. 2006-238548 is mainly used to improve efficiency of power transmission, and displays a screen according to a power reception result using a power receiving apparatus.

Japanese Patent Application Laid-Open No. 2006-238548

SUMMARY OF THE INVENTION

However, in the wireless power transmission, power is provided to terminals where the wireless power is to be provided. At this time, the power may be supplied to even terminals where the wireless power is not to be provided. For this reason, in a wireless power transmission service, it may not be possible to achieve consistent service provision to enable power to be provided to only the terminals where the power is necessary.

Accordingly, the present invention addresses the above-identified, and other issues associated with conventional methods and apparatuses. There is a need for a wireless communication apparatus, a wireless communication system, a wireless communication method, and a program that can wirelessly supply power to only terminals where power supply is necessary.

According to an embodiment of the present invention, there is provided a wireless communication apparatus. The wireless communication apparatus includes a user terminal information acquiring unit that acquires user terminal information related to user terminals, which are connected through a wireless communication network to enable communication, from the user terminals; a power supply unit that wirelessly supplies power to the user terminals; a determining unit that determines whether or not to supply the power to the user terminals based on the user terminal information; a location acquiring unit that acquires location information of the user terminals where the power is supplied; and a directivity control unit that controls directivity of power supply by the power supply unit based on the location information.

Further, the user terminal information may include at least one of contract information related to the power supply, apparatus information of the user terminals related to the power supply, and remaining power amount information of the user terminals.

Further, the user terminal information may be contract information that is related the power supply, and the directivity control unit may not orient the directivity of the power supply to the user terminals that do not make a contract for the power supply.

Further, the user terminal information may be apparatus information of the user terminals related to the power supply. When it is determined based on the apparatus information that the user terminals do not have a function of receiving supplied power, the directivity control unit may not orient the directivity of the power supply to the user terminals.

Further, the user terminal information may be remaining power amount information of the user terminals, and the directivity control unit may not orient the directivity of the power supply to the user terminals where the remaining power amounts are equal to or larger than a predetermined value.

According to another embodiment of the present invention, there is provided a wireless communication system. The wireless communication system includes a wireless communication apparatus that includes a user terminal information acquiring unit that acquires user terminal information related to user terminals on a wireless communication network, from the user terminals, a power supply unit that wirelessly supplies power to the user terminals, a determining unit that determines whether or not to supply the power to the user terminals based on the user terminal information, a location acquiring unit that acquires location information of the user terminals where the power is supplied, and a directivity control unit that controls directivity of power supply by the power supply unit based on the location information; and the user terminals that are connected to the wireless communication apparatus through the wireless communication network so as to enable communication.

According to another embodiment of the present invention, there is provided a wireless communication method. The wireless communication method includes the steps of: acquiring user terminal information related to user terminals, which are connected through a wireless communication network to enable communication, from the user terminals; wirelessly supplying power to the user terminals; determining whether or not to supply the power to the user terminals based on the user terminal information; acquiring location information of the user terminals where the power is supplied; and controlling directivity of power supply based on the location information.

According to another embodiment of the present invention, there is provided a program. The program allows a computer to function as: a unit acquiring user terminal information related to user terminals, which are connected through a wireless communication network to enable communication, from the user terminals; a unit wirelessly supplying power to the user terminals; a unit determining whether or not to supply the power to the user terminals based on the user terminal information; a unit acquiring location information of the user terminals where the power is supplied; and a unit controlling directivity of power supply based on the location information.

According to the embodiments of the present invention described above, it is possible to provide a wireless communication apparatus, a wireless communication system, a wireless communication method, and a program that can wirelessly supply power to only terminals where power supply is necessary.

BRIEF DESCRIPTION OF THE DRAWINGS

FIG. 3 is a schematic diagram illustrating an example of a location detecting circuit that detects a location of a user terminal;

FIG. 4 is a schematic diagram illustrating another example of a location detecting circuit that detects a location of a user terminal;

FIG. 6C is a diagram illustrating the configuration of a power exchanging unit that operates in a magnetic field resonance type;

FIG. 6D is a diagram illustrating the configuration of a power exchanging unit that operates in an electric field resonance type;

FIG. 7 is a schematic diagram illustrating an aspect where power is supplied to only a user terminal that can receive provided wireless power;

DETAILED DESCRIPTION OF THE PREFERRED EMBODIMENTS

Figure 1:
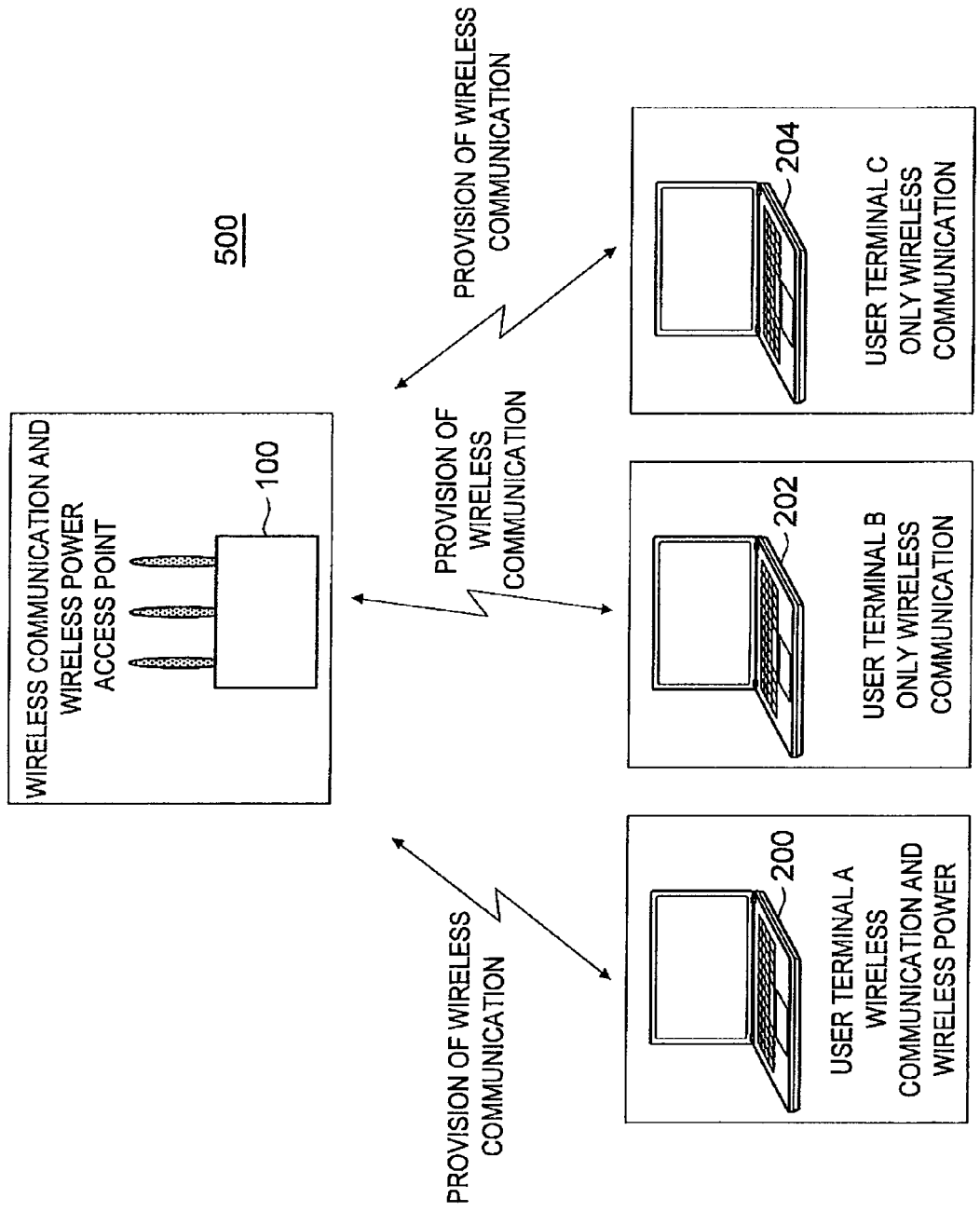
FIG. 1 is a schematic diagram illustrating the configuration of a wireless communication system 500 according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

FIG. 1 is a schematic diagram illustrating the configuration of a wireless communication system 500 according to an embodiment of the present invention. As illustrated in FIG. 1, the wireless communication system according to this embodiment includes an access point 100 that functions as a wireless communication apparatus and a plurality of portable terminals (a user terminal A 200, a user terminal B 202, and a user terminal C 204). The access point 100, and the individual user terminals 200, 202 and 204 are connected to each other through a wireless communication network, such that they can communicate with each other. Each of the access point 100 and the user terminals 200, 202 and 204 is a wireless communication apparatus that corresponds to an MB-OFDM scheme of a UWB.

Figure 2:
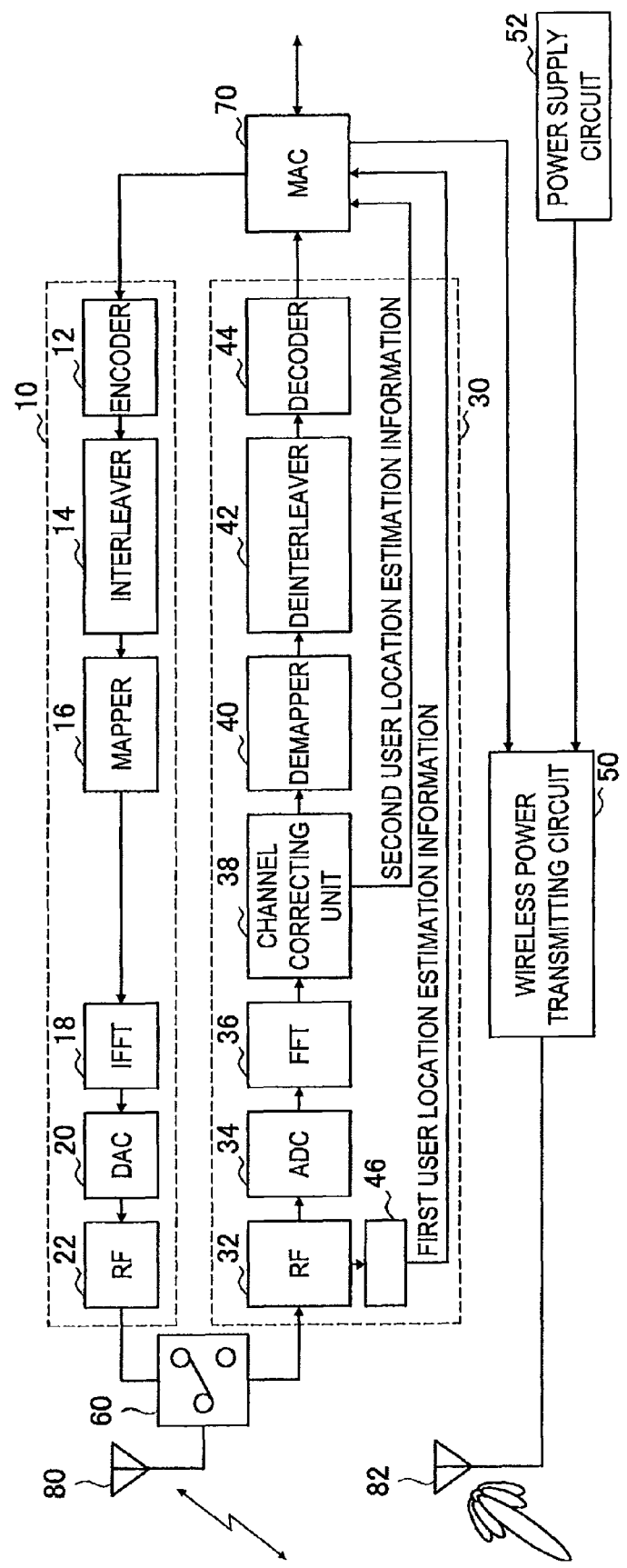
FIG. 2 is a schematic diagram illustrating the configuration of an access point.

In the wireless communication system 500 according to this embodiment, the access point 100 is configured to transmit power to a predetermined user terminal using a method, which will be described in detail below. FIG. 2 is a schematic diagram illustrating the configuration of an access point 100. The access point 100 performs wireless communication with the individual user terminals 200, 202 and 204, and receives user terminal information of the individual user terminals 200, 202 and 204, such as service contract information, apparatus information, and a remaining battery amount. In addition, when a user terminal where wireless power is provided exists, the access point 100 detects a location of the corresponding user terminal, determines a direction of wireless power to be transmitted and a power level, and provides the wireless power. For this reason, as illustrated in FIG. 2, the access point 100 includes a wireless communication transmitting circuit 10, a wireless communication receiving circuit 30, and a wireless power transmitting circuit 50.

The wireless communication transmitting circuit 10 has an encoder 12, an interleaver 14, a mapper 16, an IFFT 18, a DA converting circuit (DAC) 20, and an RF circuit 22. In addition, the wireless communication receiving circuit 30 has an RF circuit 32, an AD converting circuit (ADC) 34, an FFT 36, a channel compensating unit 38, a demapper 40, a deinterleaver 42, and a decoder 44.

Further, the access point 100 includes a transmission/reception switching unit 60, a MAC (data link layer) 70, and antennas 80 and 82. The transmission/reception switching unit 60 is connected between the RF circuits 22 and 32 and the antenna 80 and switches transmission and reception. The MAC 70 functions as a control unit of the access point 100, generates data transmitted from the wireless communication transmitting circuit 10, and acquires data received by the wireless communication receiving circuit 30. As will be described in detail below, the MAC 70 controls wireless power transmission by the wireless power transmitting circuit 50 in accordance with user terminal information that is acquired from the user terminal.

In the wireless communication transmitting circuit 10, the data that is transmitted from the MAC 70 is encoded by the encoder 12 and interleaved by the interleaver 14. The interleaved transmitted data is subjected to frequency mapping by the mapper 16 and subjected to inverse fast Fourier transform by the IFFT 18. An output signal from the IFFT 18 is converted into an analog signal by the DA converting circuit 20, up-converted by the RF circuit 22, and transmitted from the antenna 80.

In the wireless communication receiving circuit 10, a signal that is received by the antenna 80 is modulated by the RF circuit 32, and converted into an analog signal by the AD converting circuit 34. The analog signal is subjected to fast Fourier transform by the FFT 36 and transmitted to the channel compensating unit 38. The channel compensating unit 38 executes a process of compensating for a channel of the received signal. The signal that is compensated by the channel compensating unit 38 is transmitted to the demapper 40 and subjected to frequency demapping. The demapped signal is transmitted to the deinterleaver 42. The deinterleaver 42 executes a process of returning the interleaved received signal to the original signal. The received signal that is output from the deinterleaver 42 is transmitted to the decoder 44 and subjected to decoding. An output signal from the decoder 44 is transmitted to the MAC 70.

The access point 100 detects a location of each user terminal using an arrival direction estimation algorithm such as an MUSIC, a distance measurement system using a correlator, or a method such as a three-point location measurement method using a plurality of access points.

FIG. 3 is a schematic diagram illustrating an example of a location detecting circuit that detects a location of a user terminal, which illustrates an example of a circuit that detects a location by a distance measurement system using a correlator. As illustrated in FIG. 3, the location detecting circuit is configured to have a cross-correlator 46. In the location detection by the cross-correlator 46, a distance and a direction to the user terminal are measured by detecting a correlation peak by taking a cross-correlation between a correlation signal previously held at the reception side of the access point 100 and a signal transmitted from the transmission side. For example, the cross-correlator 46 includes a plurality of shift registers where received signals are input in series, and can detect a distance between a transmitter and a receiver and a direction thereof by taking a cross-correlation between an output signal from each shift register and the previously held correlation signal. The location detecting circuit can be configured by using any one of analog circuits and digital circuits. When the cross-correlator 46 is composed of an analog circuit, as illustrated in FIG. 1, the cross-correlator 46 is disposed at a rear stage of the RF circuit 32, and location information of the user terminal that is detected by the cross-correlator 46 is transmitted to the MAC 70 as first user location estimation information.

FIG. 4 is a schematic diagram illustrating another example of a location detecting circuit that detects a location of a user terminal, which illustrates an example of a circuit that detects a location using an arrival direction estimation algorithm. When the location detecting circuit illustrated in FIG. 4 is used, a plurality of antennas 80a to 80c is provided as the antenna 80. In addition, as the RF circuit 32, the AD converting circuit 34, and the FFT 36, a plurality of RF circuits 32a to 32c, a plurality of AD converting circuits 34a to 34c, and a plurality of FFTs 36a to 36c are provided, respectively. In this case, output signals from the FFTs 36a to 36c are input to the arrival direction estimation algorithm processing unit 48. The location detecting circuit illustrated in FIG. 4 uses a phase difference or an amplitude difference of signals received by the plurality of antennas 80a to 80c to execute a process by the arrival direction estimation algorithm processing unit 48, thereby estimating an arrival direction. As the arrival direction estimation algorithm, an MUSIC (Multiple Signal Classification) that is generally used in an adaptive array antenna may be used. Since the arrival direction estimation algorithm processing unit 48 is composed of a digital circuit, the arrival direction estimation algorithm processing unit can be incorporated in the channel compensating unit 38 illustrated in FIG. 1. The location information of the user terminal that is detected by the arrival direction estimation algorithm processing unit 48 is transmitted as second user location estimation information to the MAC 70.

The wireless power transmitting circuit 50 transmits power to a predetermined user terminal that is connected through a wireless communication network. For this reason, the wireless power transmitting circuit 50 is connected to a power supply circuit 52, and receives the power that is transmitted from the power supply circuit 52 to the user terminal. The power supply circuit 52 is a circuit that uses a direct current power supply such as a battery and an alternating current power supply such as a commercially used power supply to generate output power from input power. In addition, the wireless power transmitting circuit 50 is connected to the antenna 82 that transmits power to each user terminal.

If the access point 100 acquires a location of the user terminal that power is transmitted, the access point 100 varies directivity of the antenna 82 in accordance with the location of the user terminal. For this reason, the antenna 82 that is connected to the wireless power transmitting circuit 50 is composed of an antenna that can vary directivity of a transmission wave. The antenna 82 is composed of an antenna, such as a phased array antenna or an adaptive array antenna, which can electronically control directivity, or an antenna that can mechanically control a direction of an antenna.

As described above, the access point 100 is configured to transmit power to the user terminal using the wireless power transmitting circuit 50. Meanwhile, in each of the user terminals 200, 202 and 204, since contract contents and the apparatus configuration are different, only some user terminals can acquire power that is transmitted from the access point 100. In the example that is illustrated in FIG. 1, only the user terminal A 200 and the user terminal B 202 have a function of receiving power transmitted from the access point 100 (wireless power receiving circuit 250). Meanwhile, even though the user terminal C 204 does not include the wireless power receiving circuit 250, the user terminal C 204 can perform wireless communication with the access point 100. However, it may not be possible for the user terminal C 204 to receive the power transmitted from the access point 100.

Figure 5:
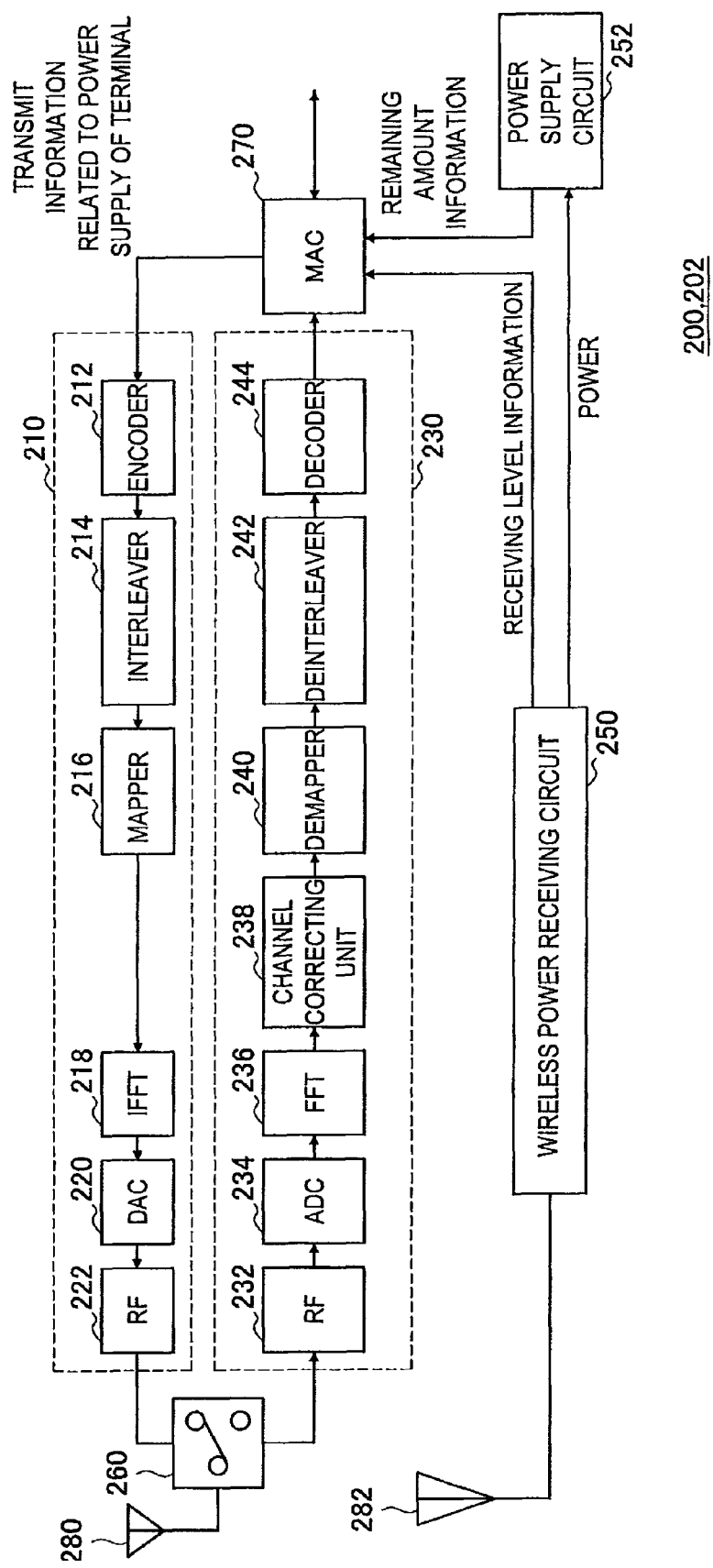
FIG. 5 is a schematic diagram illustrating the configuration of a user terminal.

FIG. 5 is a schematic diagram illustrating the configurations of a user terminal A 200 and a user terminal B 202. As illustrated in FIG. 5, each of the user terminals 200 and 202 includes a wireless communication transmitting circuit 210, a wireless communication receiving circuit 230, and a wireless power receiving circuit 250. The wireless communication transmitting circuit 210 has an encoder 212, an interleaver 214, a mapper 216, an IFFT 218, a DA converting circuit (DAC) 220, and an RF circuit 222. In addition, the wireless communication receiving circuit 230 has an RF circuit 232, an AD converting circuit (ADC) 234, an FFT 236, a channel compensating unit 238, a demapper 240, a deinterleaver 242, and a decoder 244.

Each of the user terminals 200 and 202 further includes a transmission/reception switching unit 260, a MAC (data link layer) 270, and antennas 280 and 282. The transmission/reception switching unit 260 is connected between the RF circuits 222 and 232 and the antenna 280, and switches transmission and reception. The MAC 270 functions as a control unit of the user terminals 200 and 202, and generates data transmitted from the wireless communication transmitting circuit 210 and acquires data received by the wireless communication receiving circuit 230.

The wireless power receiving circuit 250 receives power from the access point 100 through the antenna 282. The wireless power receiving circuit 250 is connected to the power supply circuit 252, and the power that is received from the access point 100 and acquired is transmitted to a power supply circuit 252. The power that is supplied to the wireless power receiving circuit 250 is accumulated in the power supply circuit 252, or is not accumulated in the power supply circuit 252 but used for a circuit operation. The wireless power receiving circuit 250 transmits received level information to the MAC 270. In addition, the power supply circuit 252 transmits remaining amount information to the MAC 270. The MAC 270 transmits the received level information and the remaining amount information from the wireless communication transmitting circuit 210 to the access point 100. As a result, the access point 100 can transmit power in accordance with the received level information and the remaining amount information. Accordingly, the access point 100 can vary directivity of the antenna 82 in accordance with the received level information or control a transmitted power level. In addition, the access point 100 can determine whether or not to perform power transmission in accordance with the remaining amount information, as will be described in detail below.

The user terminal C 204 does not include the wireless power receiving circuit 250 illustrated in FIG. 5, but the configuration of the user terminal C other than the wireless power receiving circuit 250 is the same as those of the user terminal A 200 and the user terminal B 202.

Next, a method for transmitting power from the wireless power transmitting circuit 50 of the access point 100 to the wireless power receiving circuit 250 of each of the user terminals 200 and 202 will be described. The wireless power transmitting circuit 50 includes a power exchanging unit 51 that operates in accordance with an operational principle, such as an electromagnetic inductive type, an electric wave reception type, a magnetic field resonance type, and an electric field resonance type. In addition, the wireless power receiving circuit 250 includes a power exchanging unit 251 that operates in accordance with the operational principle. Hereinafter, the configurations of the power exchanging units 51 and 251 that operate in accordance with each operational principle will be specifically described based on FIGS. 6A to 6D.

Figure 6A:
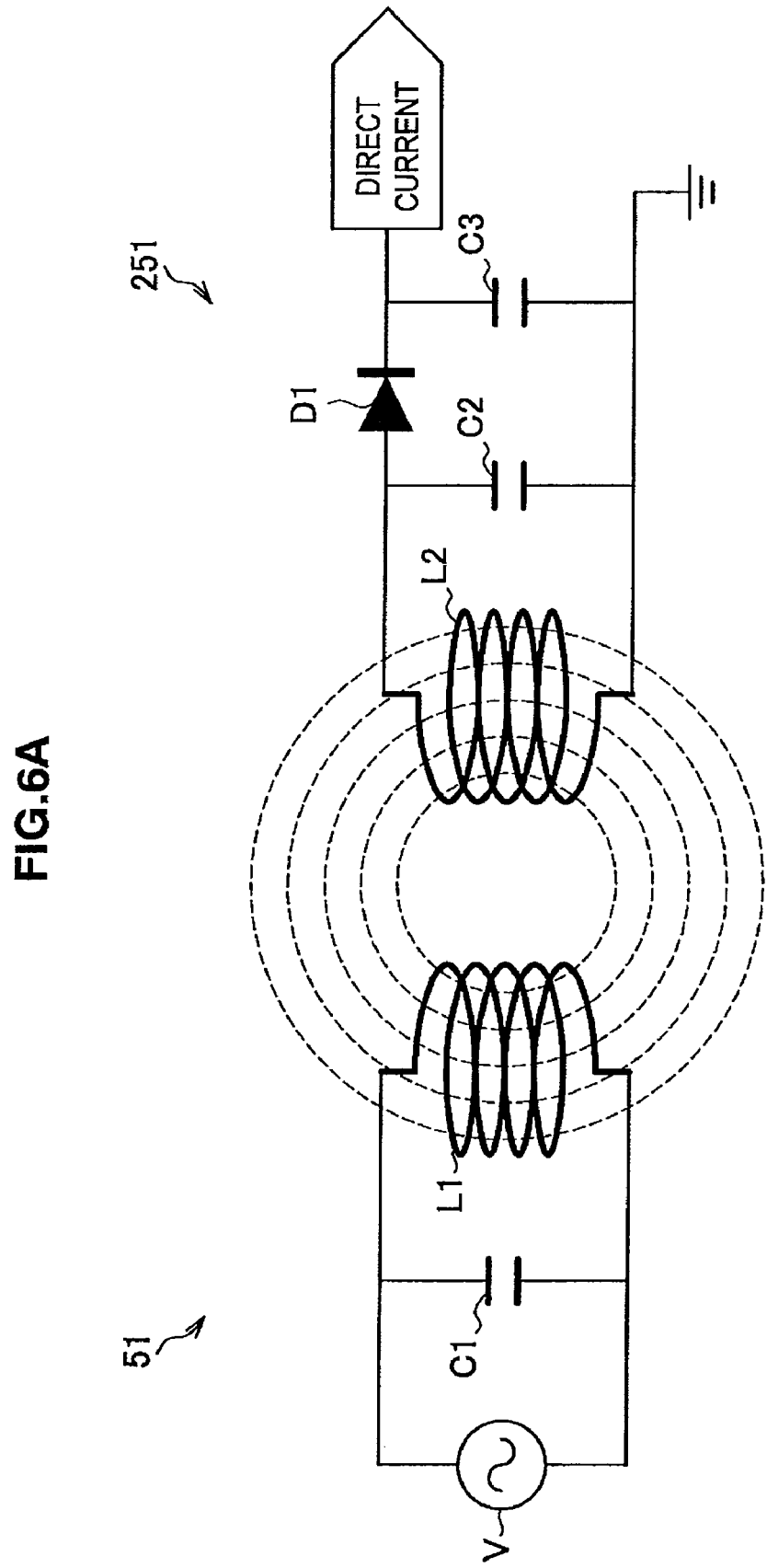
FIG. 6A is a diagram illustrating the configuration of a power exchanging unit that operates in an electromagnetic induction type.

FIG. 6A is a diagram illustrating the configurations of a power exchanging unit 51 and a power exchanging unit 251 that operate in an electromagnetic inductive type. As illustrated in FIG. 6A, the power exchanging unit 51 that operates in the electromagnetic inductive type includes an alternating current source V, a capacitor C1, and an inductor L1, and the power exchanging unit 251 includes an inductor L2, a capacitor C2, a capacitor C3, and a diode D1. In this configuration, if an alternating current is output from the alternating current source V, the alternating current flows through the inductor L1, and a magnetic flux is generated around the inductor L1. In addition, the diode D1 and the capacitor C3 rectify the alternating current that flows through the inductor L2 by the magnetic flux, and a direct current is obtained in the power exchanging unit 251.

Figure 6B:
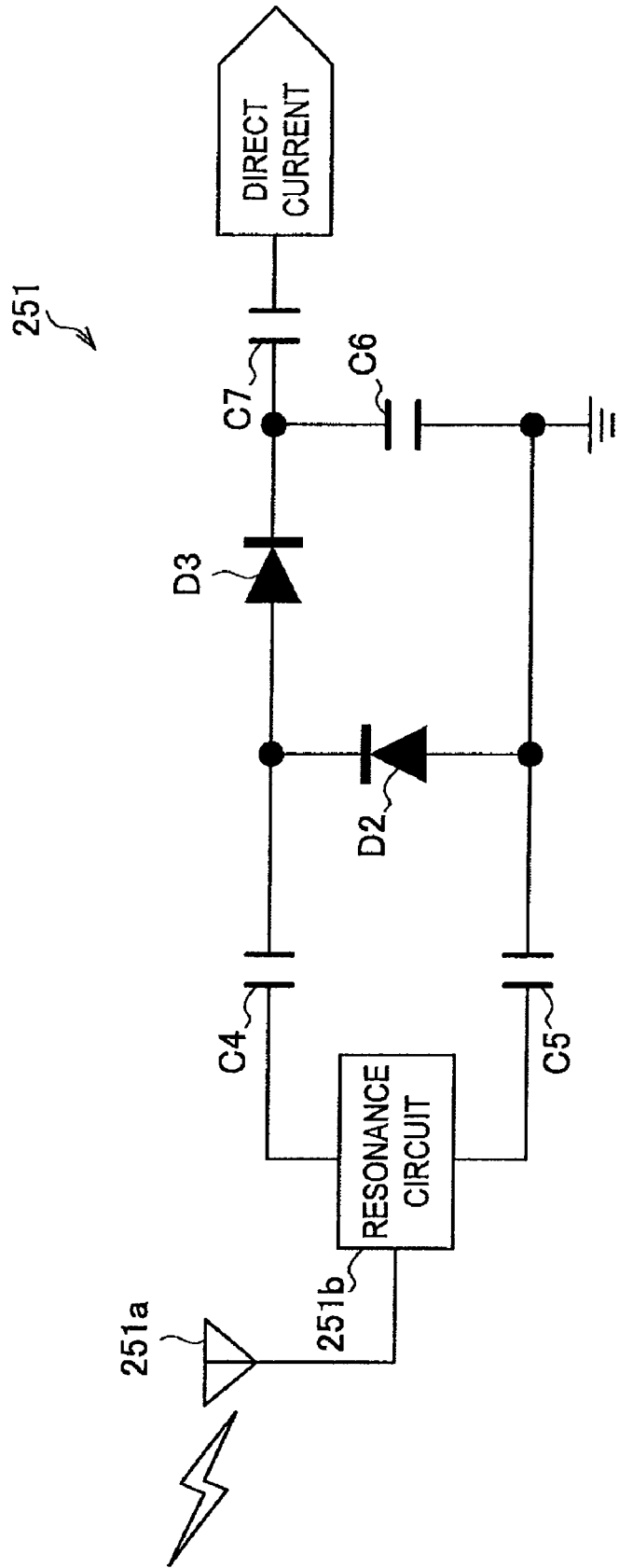
FIG. 6B is a diagram illustrating the configuration of a power exchanging unit that operates in an electric wave reception type.

FIG. 6B is a diagram illustrating the configuration of a power exchanging unit 251 that operates in an electric wave reception type. As illustrated in FIG. 6B, the power exchanging unit 251 that operates in the electric wave reception type includes an antenna 251a, a resonance circuit 251b, a capacitor C4, a capacitor C5, a diode D2, a diode D3, a capacitor C6, and a capacitor C7. In this configuration, if an electric wave is received by the antenna 251a, an alternating current is supplied from the antenna 251a to the resonance circuit 251b, and the resonance circuit 251b amplifies the alternating current using resonance. If a rectifying circuit composed of the diode D3 and the capacitor C6 rectifies the amplified alternating current, a direct current component is extracted, and the direct current is obtained in the power exchanging unit 251. In the case of the electric wave reception type, the wireless power transmitting circuit 50 of the access point 100 can have the same configuration as the wireless communication transmitting circuit 10.

FIG. 6C is a diagram illustrating the configurations of a power exchanging unit 51 and a power exchanging unit 251 that operate in a magnetic field resonance type. As illustrated in FIG. 6C, the power exchanging unit 51 that operates in the magnetic field resonance type includes a capacitor C8 and an inductor L3, and the power exchanging unit 251 includes a capacitor C9 and an inductor L4. In the case of the magnetic field resonance type, it is possible to acquire power that is generated in the inductor L4 of the power exchanging unit 251 by magnetic field resonance that is generated in the inductors L3 and L4.

FIG. 6D is a diagram illustrating the configurations of a power exchanging unit 51 and a power exchanging unit 251 that operate in an electric field resonance type. As illustrated in FIG. 6D, each of the power exchanging units 51 and 251 that operate in the electric field resonance type is composed of a dielectric.

The magnetic field resonance type and the electric field resonance type use a principle of resonance in which, when two vibrators having the unique number of vibrations are arranged, a vibration applied to one side of the two vibrators is transmitted to the other side. In the magnetic field resonance type and the electric field resonance type, since transmission efficiency is high, it is possible to transmit power of several kilowatts at a distance of several meters.

In the system according to this embodiment, both the wireless communication and the wireless power can be provided to the user terminal, the consistent service can be provided to each user terminal by supplying the wireless power in accordance with the user terminal information, and the wireless power can be provided without the waste of power.

FIG. 1 illustrates an aspect where wireless communication is performed between the access point 100 and the user terminals 200, 202 and 204. The access point 100 can provide both the wireless communication and the wireless power, but the wireless communication can be provided to all of the user terminals.

The user terminal B 202 is an apparatus that includes the wireless power receiving circuit 250 and receives the provided wireless power, but does not make a contract with a provider for provision of the wireless power. For this reason, the user terminal B 202 can perform wireless communication with the access point 100, but may not receive the supplied wireless power. In addition, since the user terminal C does not include the wireless power receiving circuit 250, the user terminal C may not receive the supplied wireless power from the access point 100. Accordingly, the access point 100 can provide both the wireless communication and the wireless power to the user terminal A 200 but provide only the wireless communication to the user terminal B 202 and the user terminal C 204.

FIG. 7 is a schematic diagram illustrating an aspect where power is supplied to only the user terminal A 200 capable of receiving provided wireless power, as an acquisition result of user terminal information and locations of the individual user terminals 200, 202 and 204 in the access point 100. The access point 100 orients directivity of the antenna 82 for wireless power provision to the user terminal A 200 in accordance with the estimated location of the user terminal A 200, thereby supplying wireless power to only the user terminal A. As a result, power can be surely prevented from being transmitted to the user terminal B 202 where it is not needed to provide wireless power according to the contract and the user terminal C 204 that does not have the wireless power receiving circuit 250, thereby suppressing wasteful power transmission.

Each of the user terminals 200, 202 and 204 uses a wireless communication network to transmit user terminal information, which includes information related to a service for which each terminal makes a contract with a provider, information related to the apparatus configuration of each terminal, and information related to the remaining capacity of a battery of the power supply circuit 252, to the access point 100. The information may be spontaneously transmitted by each of the user terminals 200, 202 and 204 at predetermined timing. Each of the user terminals 200, 202 and 204 can receive a transmission request of user terminal information from the access point 100, and transmit the user terminal information to the access point 100.

The access point 100 confirms existence of the user terminal A 200 that is capable of receiving supplied wireless power based on the user terminal information that is received from the individual user terminals 200, 202 and 204. In addition, the access point 100 detects the location of the user terminal A 200 using the above-described method based on a wireless communication signal received from the user terminal A 200, controls directivity of the antenna 82 in accordance with the location of the user terminal, and controls a transmitted power level.

Figure 8:
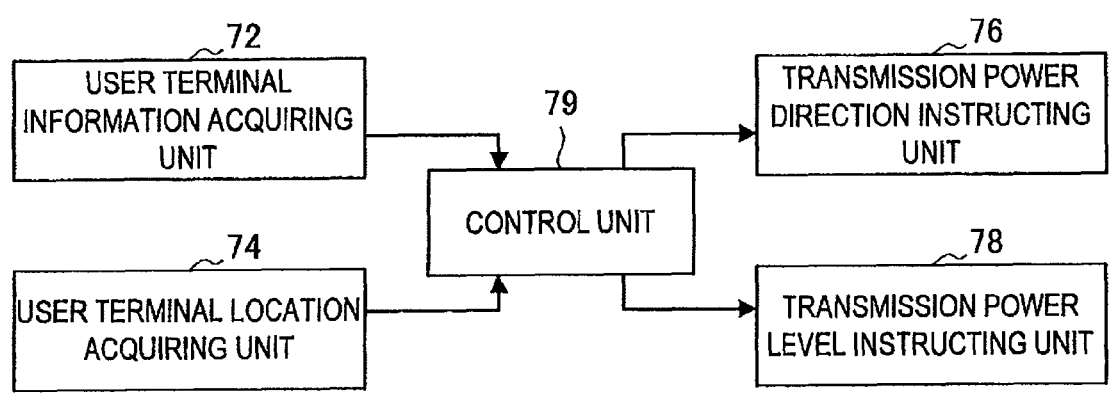
FIG. 8 is a block diagram illustrating the functional configuration of a MAC of an access point.

FIG. 8 is a block diagram illustrating the functional configuration of a MAC 70 of an access point 100. The control of the wireless power transmission based on the user terminal information is mainly performed by the MAC 70. As illustrated in FIG. 8, the MAC 70 includes a user terminal information acquiring unit 72, a user terminal location acquiring unit 74, a transmission power direction instructing unit 76, a transmission power level instructing unit 78, and a control unit 79. The user terminal information acquiring unit 72 acquires user terminal information, such as contract information, terminal function information, and remaining battery amount information of each user terminal. The user terminal location acquiring unit 74 acquires a location of the individual user terminal based on an output (first and second user location estimation information) of the location detecting circuit that is illustrated in FIGS. 3 and 4. In order to orient directivity of the antenna 82 to the user terminal where power is to be supplied, the transmission power direction instructing unit 76 transmits transmitted power direction information to the wireless power transmitting circuit 50. In order to transmit power having an appropriate level to the user terminal where the power is to be supplied, the transmission power level instructing unit 78 transmits transmitted power level information to the wireless power transmitting circuit 50. In order to transmit transmitted power direction information and transmitted power level information to the wireless power transmitting circuit 50 in accordance with the user terminal information and the user terminal location, the control unit 79 controls the transmission power direction instructing unit 76 and the transmission power level instructing unit 78. The functional block that is illustrated in FIG. 8 can be configured by using hardware or an arithmetic processing emit (CPU) and software (program) that allows the arithmetic processing unit to function. When the functional block is configured by using the arithmetic processing unit and the software, the program can be stored in a recording medium, such as a memory, which is included in the access point 100. The process that will be described in detail below can be realized by the functional block that is included in the MAC.

Figure 9:
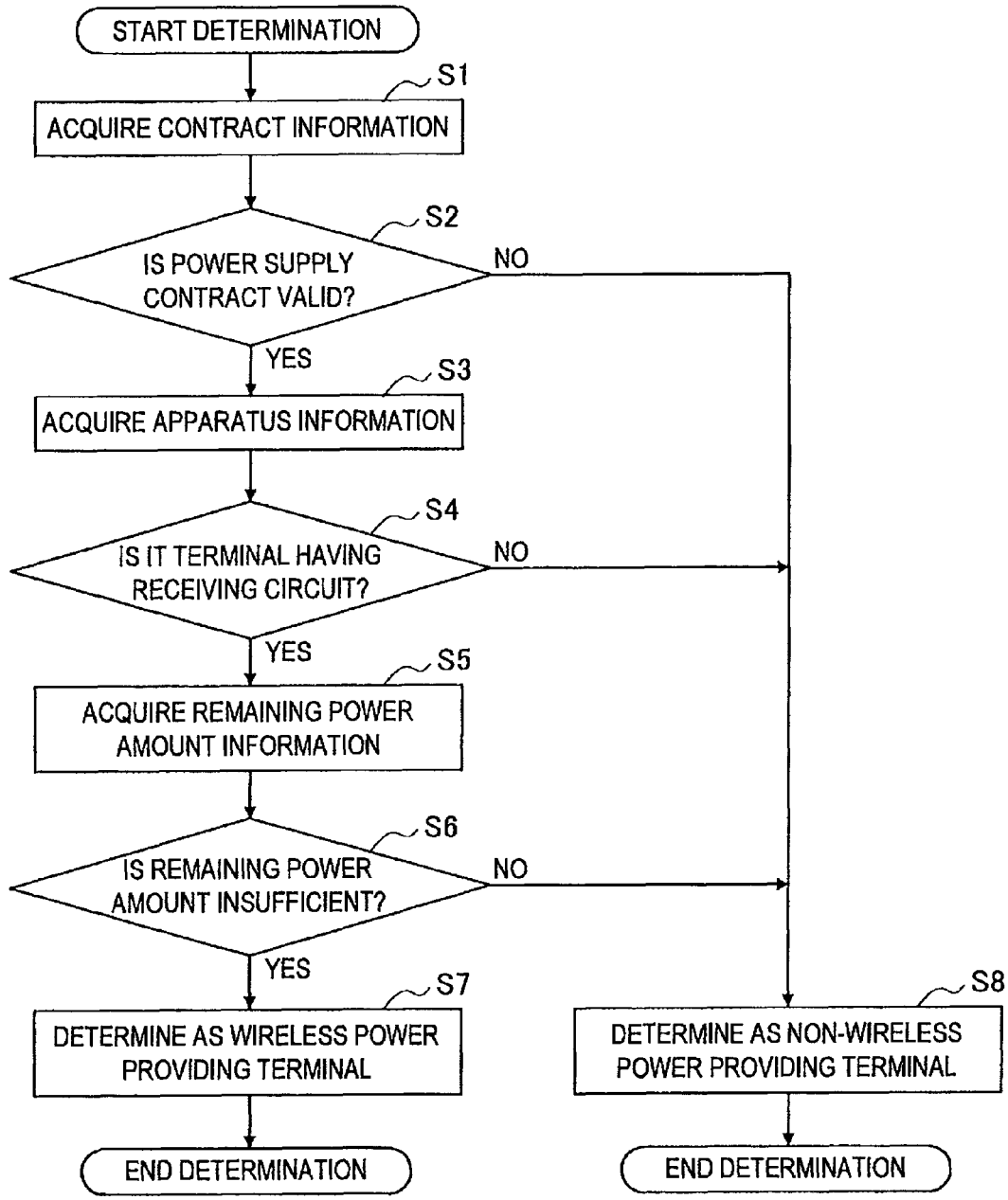
FIG. 9 is a flowchart illustrating a flow of a power supply determining process that determines whether or not to perform power supply based on user terminal information.
Figure 10:
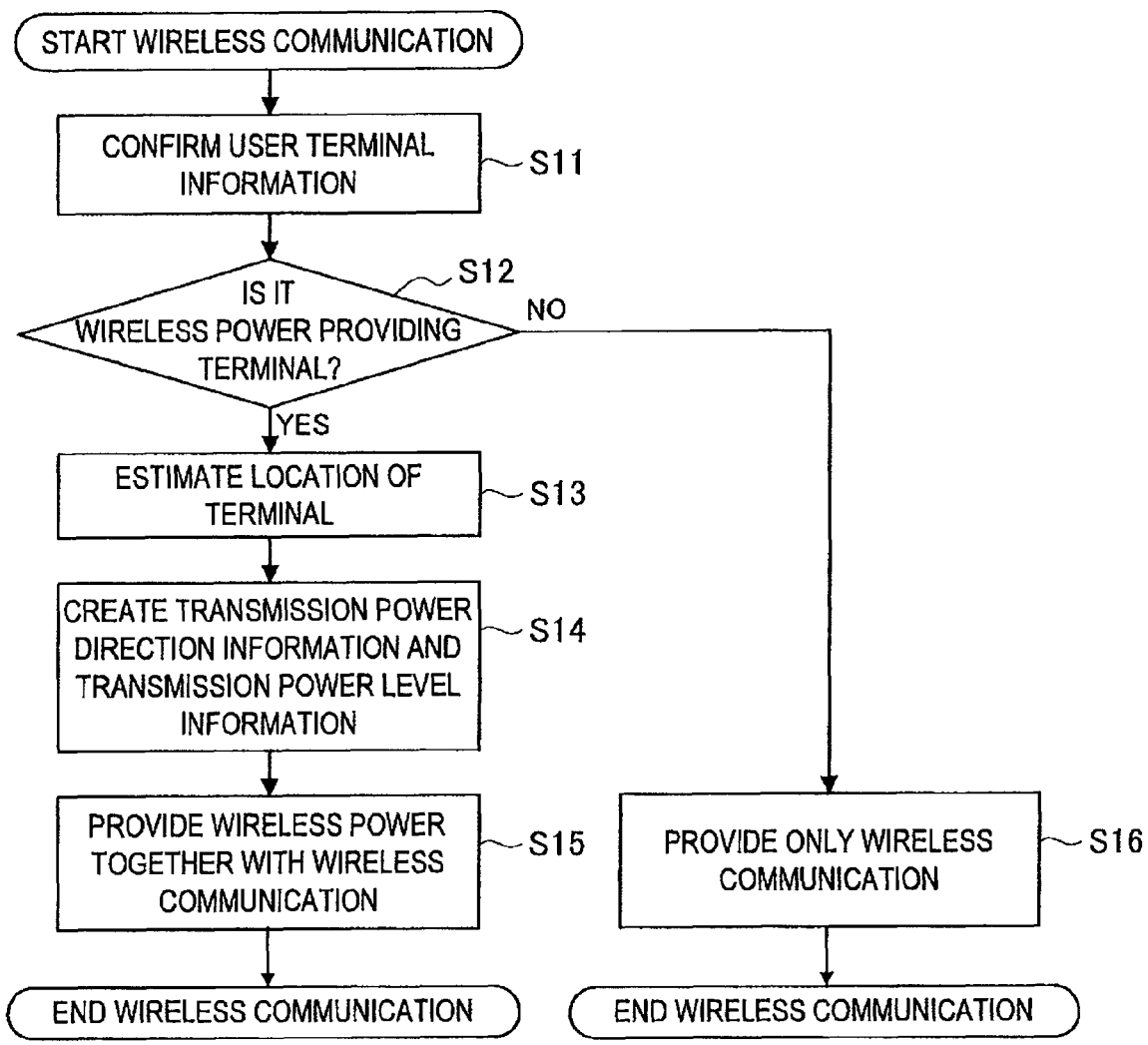
FIG. 10 is a flowchart illustrating a process that is executed after determining whether a terminal is a wireless power providing terminal by a process illustrated in FIG. 9.

Next, a process in a system according to this embodiment will be described based on the flowcharts that are illustrated in FIGS. 9 and 10. FIG. 9 is a flowchart illustrating a flow of a power supply determining process that determines whether or not to perform power supply based on user terminal information transmitted from each of the user terminals 200, 202 and 204. The access point 100 determines whether each user terminal is a terminal capable of providing wireless power (wireless power providing terminal) based on the process that is illustrated in FIG. 9.

Referring to FIG. 9, first, contract information of each of the user terminals 200, 202 and 204 is acquired (Step S1). The contract information of each of the user terminals means information that is related to a service utilization contract for which a user of each user terminal previously makes a contract with a provider of a power supply service using the access point 100. The contract information of each of the user terminals 200, 202 and 204 may include a service available period or an amount of provided power. The contract information is stored in advance (at the time of a service utilization contract), in the memory that is included in each of the user terminals 200, 202 and 204. In addition, the user terminal information acquiring unit 72 of the MAC 70 acquires the contract information that is transmitted from each of the user terminals.

Next, the access point 100 determines whether the contents of the acquired contract information are valid (Step S2). For example, when the transmitted contract information indicates that the service available period is terminated and the contents of the contract information are invalid, the control unit 79 of the MAC 70 determines that the corresponding user terminal is not a wireless power providing terminal (Step S8), and completes a process.

When it is determined in Step S2 that the contents of the contract information are valid, apparatus information that indicates whether each of the user terminals 200, 202 and 204 has a receiving circuit (wireless power receiving circuit 250) is acquired (Step S3). In addition, the user terminal information acquiring unit 72 of the MAC 70 acquires the apparatus information that is transmitted from each user terminal.

Then, it is determined whether each of the user terminals 200, 202 and 204 has the receiving circuit based on the acquired apparatus information (Step S4). When it is determined that each user terminal does not have the receiving circuit, the control unit 79 of the MAC 70 determines that the corresponding user terminal is not a wireless power providing terminal (Step S8), and completes a process.

Next, the remaining power amount information of each user terminal is acquired (Step S5). The remaining power amount information is information that is transmitted from the power supply circuit 252 to the MAC 70, as described with reference to FIG. 5. The remaining power amount information can be represented by a percentage of the remaining power amount with respect to the power supply capacity of the power supply circuit 252 of the user terminal. In addition, the user terminal information acquiring unit 72 of the MAC 70 acquires the remaining power amount information that is transmitted from each user terminal.

Then, the access point 100 determines whether the remaining power amount of the user terminal 200 is insufficient based on the acquired remaining power amount information, by a comparison with a predetermined threshold value (Step S6). When it is determined that the remaining power amount of the user terminal 200 is sufficient, the control unit 79 of the MAC 70 determines that the power supply is not performed (Step S8), and completes a process. Meanwhile, when it is determined that the remaining power amount of the user terminal 200 is insufficient, the control unit 79 determines that the user terminal 200 is a wireless power providing terminal (Step S7), and completes a process. The order of the processes that are illustrated in FIG. 9 is not limited to the above example, but may be an arbitrary order.

FIG. 10 is a flowchart illustrating a process that is executed after determining whether a terminal is a wireless power providing terminal by the process illustrated in FIG. 9. First, in accordance with the process that is illustrated in FIG. 10, user terminal information is confirmed (Step S11), and it is determined whether a terminal is a wireless power providing terminal (Step S12).

When it is determined in Step S12 that the terminal is the wireless power providing terminal, the location of the user terminal that receives the provided wireless power is estimated (Step S13). Next, in Step S14 based on the location of the user terminal estimated in Step S13, information related to a power transmission direction (transmitted power direction information) is created. In Step S14 based on the location of the user terminal, level information of the transmitted power (transmitted power level information) is created.

Next, in Step S15, the wireless communication and the wireless power are prowled to the wireless power providing terminal. At this time, the wireless power transmitting circuit 50 controls directivity of the antenna 82 based on the transmitted power direction information, and controls the transmitted power level based on the transmitted power level information.

As described above, according to this embodiment, the power is not supplied to all of the user terminals that exist in the space within the wireless communication network, and the user terminals can be classified into user terminals where the power is to be supplied and user terminals where the power is not to be supplied and the wireless power can be supplied to the corresponding user terminals.

Accordingly, in a wireless communication service that is available to the public can use, when user terminals that make a contract for only the wireless communication and user terminals that make a contract for both the wireless communication and the wireless power exist, the power can be supplied to only the user terminals that make a contract for the wireless power. As a result, when there is a user terminal that has the wireless power receiving circuit 250 but does not make a contract for the wireless power, the power can be prevented from being supplied to the user terminal, thereby maintaining a consistent service.

Further, in the case of the user terminal where the remaining power amount is sufficient and the user terminal that may not receive the wireless power due to the apparatus configuration, the wireless power is not transmitted to the user terminal. As a result, wasteful power transmission can be prevented and power consumption can be minimized. Accordingly, the power of the required amount can be supplied to only the user terminal that needs to receive the supplied power.

The present application contains subject matter related to that disclosed in Japanese Priority Patent Application JP 2008-100743 filed in the Japan Patent Office on Apr. 8, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A wireless communication apparatus comprising:
   a user terminal information acquiring unit that acquires user terminal information related to user terminals, which are connected through a wireless communication network to enable communication, from the user terminals, the acquired user terminal information including contract information for the user terminals reflecting a contract for services available to the user terminals;
   a power supply unit that wirelessly supplies power to the user terminals;
   a determining unit that determines whether or not to supply the power to the user terminals based on the user terminal information by determining validity of the contract information for the user terminals;
   a location acquiring unit that acquires location information of the user terminals where the power is supplied; and
   a directivity control unit that controls directivity of power supply by the power supply unit based on the location information.

2. The wireless communication apparatus according to claim 1, wherein the user terminal information comprises apparatus information of the user terminals related to the power supply, and remaining power amount information of the user terminals.

3. The wireless communication apparatus according to claim 1, wherein:
   the contract information indicates a power service availability period, and
   the directivity control unit does not orient the directivity of the power supply to the user terminals when the determining unit determines that the contract information is invalid based on the power service availability period.

4. The wireless communication apparatus according to claim 1, wherein the user terminal information comprises apparatus information of the user terminals related to the power supply, and when it is determined based on the apparatus information that the user terminals do not have a function of receiving supplied power, the directivity control unit does not orient the directivity of the power supply to the user terminals.

5. The wireless communication apparatus according to claim 1, wherein the user terminal information comprises remaining power amount information of the user terminals, and the directivity control unit does not orient the directivity of the power supply to the user terminals where the remaining power amounts are equal to or larger than a predetermined value.

6. A wireless communication system comprising:
   user terminals connected to a wireless communication network so as to enable communication; and
   a wireless communication apparatus comprising:
      a user terminal information acquiring unit that acquires user terminal information related to the user terminals from the user terminals, the acquired user terminal information including contract information for the user terminals reflecting a contract for services available to the user terminals;
      a power supply unit that wirelessly supplies power to the user terminals;
      a determining unit that determines whether or not to supply the power to the user terminals based on the user terminal information by determining validity of the contract information for the user terminals;
      a location acquiring unit that acquires location information of the user terminals where the power is supplied; and
      a directivity control unit that controls directivity of power supply by the power supply unit based on the location information.

7. A wireless communication method comprising the steps of:
   acquiring user terminal information from user terminals, the acquired user terminal information including contract information for the user terminals reflecting a contract for services available to the user terminals;
   determining whether or not to supply the power to the user terminals based on the user terminal information by determining validity of the contract information for the user terminals;
   acquiring location information of the user terminals where the power is supplied;
   controlling directivity of power supply based on the location information; and
   wirelessly supplying power to the user terminals when the contract information is valid.

8. A non-transitory computer readable storage medium storing instructions that, when executed by a processor, performs a method comprising:
   acquiring user terminal information from user terminals, the acquired user terminal information including contract information for the user terminals reflecting a contract for services available to the user terminals;
   determining whether or not to supply the power to the user terminals based on the user terminal information by determining validity of the contract information for the user terminals;
   acquiring location information of the user terminals where the power is supplied;
   controlling directivity of power supply based on the location information; and
   wirelessly supplying power to the user terminals when the contract information is valid.

* * * * *